(12) United States Patent
Georgiades

(10) Patent No.: US 12,249,745 B2
(45) Date of Patent: Mar. 11, 2025

(54) BIOLOGICAL BATTERY AND METHODS OF MAKING SAME

(71) Applicant: Austin Georgiades, Marlborough, CT (US)

(72) Inventor: Austin Georgiades, Marlborough, CT (US)

(*) Notice: Subject to any disclaimer, the term of this patent is extended or adjusted under 35 U.S.C. 154(b) by 605 days.

(21) Appl. No.: 17/408,415

(22) Filed: Aug. 21, 2021

(65) Prior Publication Data
US 2022/0059858 A1    Feb. 24, 2022

Related U.S. Application Data

(60) Provisional application No. 63/069,042, filed on Aug. 22, 2020.

(51) Int. Cl.
*H01M 8/16*     (2006.01)

(52) U.S. Cl.
CPC ..................................... *H01M 8/16* (2013.01)

(58) Field of Classification Search
CPC ................................. H01M 8/16; H01M 14/00
See application file for complete search history.

(56) References Cited

U.S. PATENT DOCUMENTS 10,340,546 B1 * 7/2019 Khan ...................... G01S 19/14

* cited by examiner

*Primary Examiner* — Sarah A. Slifka
(74) *Attorney, Agent, or Firm* — SLEMAN & LUND LLP

(57) ABSTRACT

A biological battery includes a first cell layer formed of a sheet of biological cells polarized in a same direction, a second cell layer formed of a sheet of biological cells polarized in a same direction, a separating membrane disposed between the first cell layer and the second cell layer, and an encapsulating outer membrane encasing each of the first cell layer, the second layer and the separating membrane, wherein the encapsulating outer membrane is permeable to small molecules like glucose and amino acids, but substantially impermeable to larger proteins like antibodies.

20 Claims, 3 Drawing Sheets

BIOLOGICAL BATTERY AND METHODS OF MAKING SAME

CROSS-REFERENCE TO RELATED APPLICATIONS

This application claims priority to U.S. Provisional Ser. No. 63/069,042, filed on Aug. 22, 2020, the content of which is hereby incorporated by reference in its entirety as if fully set forth herein.

FIELD OF THE DISCLOSURE

The present disclosure relates to devices and methods for creating a battery. More particularly, the present disclosure relates to a biological battery capable of converting the potential energy stored in electrochemical gradients produced by biological cells into electrical energy.

BACKGROUND OF THE DISCLOSURE

Batteries are often used to power implantable medical devices. Such batteries may be single-use or rechargeable, and their size and configuration will vary based on intended use. For example, cardiac rhythm management devices are implantable devices that provide electrical stimulation to the heart in order to treat disorders of cardiac rhythm. A pacemaker is a cardiac rhythm management device that paces the heart with timed pacing pulses, while an implantable cardioverter/defibrillator (ICD) is a device that provides defibrillation shock therapy to the heart. It is also common for cardiac rhythm management devices to combine both of these functions. These devices are usually implanted into the chest or abdominal wall with electrode leads connected to the device then passed transvenously into the heart. It is desirable for an implanted device to be as compact and physiologically-shaped as possible so as to minimize discomfort to the patient. Cardiac rhythm management devices, as well as other types of implantable medical devices, are powered by a battery contained within the housing of the device. The size and shape of a battery which supplies sufficient power to operate the device may limit how small and physiologically-shaped the housing of the device can be made.

SUMMARY OF THE DISCLOSURE

In some embodiments, a biological battery includes a first cell layer formed of a sheet of biological cells polarized in a same direction, a second cell layer formed of a sheet of biological cells polarized in a same direction as the first, a separating membrane disposed between the first cell layer and the second cell layer, and an encapsulating outer membrane encasing each of the first cell layer, the second layer and the separating membrane, wherein the encapsulating outer membrane is permeable to small molecules like glucose and amino acids, but substantially impermeable to larger proteins like antibodies.

BRIEF DESCRIPTION OF THE DISCLOSURE

Various embodiments of the presently disclosed devices and methods are described herein with reference to the drawings, wherein.

Figure 1:
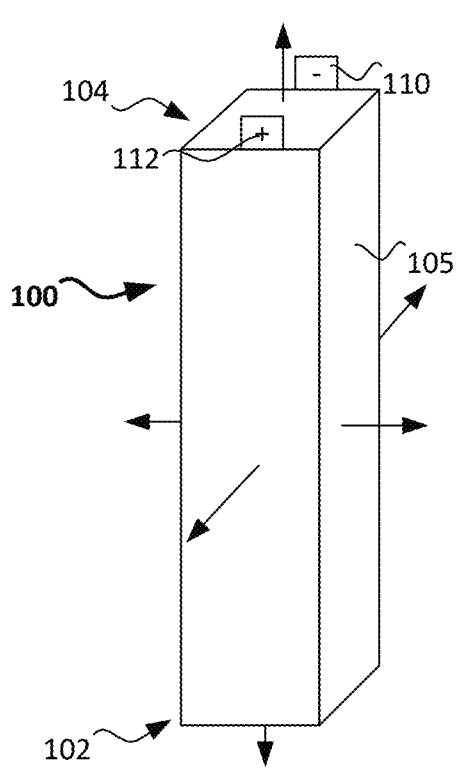
FIG. 1 is a schematic representation of a biological battery having an outer shell formed of an outer membrane.

Various embodiments of the present invention will now be described with reference to the appended drawings. It is to be appreciated that these drawings depict only some embodiments of the invention and are therefore not to be considered limiting of its scope.

DETAILED DESCRIPTION

Despite the various improvements that have been made to batteries, conventional devices suffer from some shortcomings. There therefore is a need for further improvements to the devices, systems, and methods of manufacturing and using biological batteries, for example, for implantable medical devices. Among other advantages, the present disclosure may address one or more of these needs.

A biological battery may be formed to harness electrochemical potential produced by cells in vivo to generate usable current within a circuit to power, for example, an implantable medical device. The present disclosure describes a mechanism by which chemical energy present in the body can be converted into usable electrical energy, thus allowing power for implanted devices to be generated internally, without a need for external power, and without the need to replace or recharge an implanted battery. In some cases, this may extend the useable lifetime of an implantable device and/or reduce the risks associated with removing or recharging such devices.

In some embodiments, an exterior of the battery may include an enveloping, encapsulating and/or encasing biocompatible, ultrafiltration outer membrane (hereinafter "outer membrane") permeable to small molecules like glucose and amino acids, but substantially or completely impermeable to larger proteins like antibodies. Suitable materials and methods of forming the outer membrane are described in WO 2008/086477 to Fissel et al., the disclosure of which being hereby incorporated by reference in its entirety as if fully set forth herein. Through the use of such an outer membrane, biological cells contained within the battery may be able to access the chemicals necessary to synthesize proteins and to power cellular metabolism due to the permeability of outer membrane to small molecules like glucose and amino acids which are present within living organisms without inducing an immune response in the organism within which it is implanted (e.g., due to impermeability of outer membrane to large molecules like antibodies, etc.).

In some embodiments, biological cells enclosed within outer membrane may be capable of pumping ions to form electrochemical potential. In some examples, biological cells within the battery are made to pump ions in a net direction. In some examples, polarization may be induced after the cells are placed in their respective compartments within the battery. Amongst others, suitable cells may include the acid-producing cells of the stomach (also called parietal or oxyntic cells). These epithelial cells naturally polarize so that they pump acidic protons ($H^+$) into the stomach lumen and alkaline bicarbonate ($HCO_3^-$) into the blood. In the case that oxyntic cells were used in a biological battery, they may all be made to pump protons in one direction and bicarbonate in the opposite direction. The oxyntic cells may be configured to form a sheet that is one biological cell thick referred to throughout the disclosure as an oxyntic "cell layer" or "cell sheet" with cells within the sheet having a net direction of polarization, which is defined as the average of the sum of all equally weighted vectors defining the change in position of each molecular entity of a chemical species within a subset of all chemical species over time which occurs as a result of all biological cells comprising a cell layer or cell sheet. It should be noted that cell layers or cell sheets may be more than one cell thick & include at least one cell. Batteries may contain multiple cell layers, in which case, at least one cell layer must be polarized such that its net direction of polarization concentrates certain molecular entities (group 1) in a region (region 1) separated from another region (region 2) where certain molecular entities having electrochemical potential when separated from the molecular species in region 1 by a membrane (group 2) are concentrated by at least one cell layer polarized such that group 2 is concentrated across a membrane from group 1. This may be achieved using two cell layers separated by a membrane, but may also be achieved using one cell layer, for example, by taking a square cell layer which is one cell thick and has a side length of 100 cells which has a section of membrane covering one of the faces of the cell layer that is 100 cells by 100 cells in area and rolling it up into a cylinder.

In some embodiments, separating these cell layers would be sections of separating membranes capable of converting electrochemical potential of a conjugate acid-base pair into electrical energy (See, U.S. Pat. No. 4,311,771 to Walther, incorporated by reference herein). The basic mechanism of operation of separating membranes is to allow neutralization of acid and base to occur across compartments, thus generating an electrical potential difference, in the same way that neutralization across the bipolar separating membrane as detailed in U.S. Pat. No. 4,311,771 creates an electrical potential difference between the acid stream and base stream. Instead of the concentrations of acid and base being replenished via flow of acidic and basic solutions to their respective sides of the separating membrane, acid and base concentrations in a biological battery are replenished by oxyntic cells generating conjugate acid-base pair using intracellular carbonic anhydrase and then pumping the acid and base to their respective sides of the cell layer. The electrical potential difference created by neutralization across the separating membrane drives current to flow through the circuit as is described in U.S. Pat. No. 4,311,771. In some examples, uniform orientation of all cell layers would mean that all sections of the separating membrane would have a high gradient of protons (conjugate acid) and bicarbonate (conjugate base) across them. So, while outer membrane serves to insulate the cell layers from the outside environment, separating membrane serves to internally separate cell layers from each other within "compartments" and forms the basis of electricity generation needed to power a circuit.

In some examples, two cell layers separated by a separating membrane form an electrochemical cell. Batteries can be formed by stacking electrochemical cells together. Within an electrochemical cell, conjugate-acid cations from one cell layer are concentrated on one side of separating membrane while conjugate-base anions of a neighboring cell layer are concentrated on the other. It is at the separating membrane that the electrochemical potential is converted into electrical energy. In some examples, the number of electrochemical cells is determined by the number of sections of separating membrane that are present in the battery, with the number of possible separating membranes being one less than the number of cell layers (in the case the battery is linear) or equal to the number of cell layers (in the case the battery is circular or cylindrical). Linear biological batteries are characterized as having 2 cell layers which border only 1 section of separating membrane.

It should be noted that all separating membranes may be fused along their entire periphery to the encapsulating outer membrane, which together form isolated compartments for each cell layer, meaning electrochemical potential formed across the separating membrane can be harnessed through the separating membrane. This is useful to optimize the efficiency of electrical energy generation in the battery. In addition, the outer membrane may be fused at all edges to form a continuous, enveloping layer that separates cell layers from the outside cellular environment. This may be useful to ensure that no macromolecules like antibodies can bind the biological cells which power the battery and induce immune response (these biological cells would likely not be native to the body of someone with a biological battery implanted inside of them and thus may induce an immune response in the organism in which it is implanted and/or be harmed by the host's immune system if exposed to antibodies or other immune proteins within an organism).

Biocompatible leads from each side of a separating membrane may pass through the outer membrane and be collected together into positive and negative electrodes that can supply direct current (DC) electrical energy which may power attached circuitry. In this way, the electrical energy supplied by the biological battery can be used to power a circuit when implanted into a living organism using only the chemical energy naturally present in the body of the organism in which it is implanted. Cell layers may be unidirectionally polarized by either blotting proteins that induce oxyntic cell polarization onto specific sides of the separating membrane before oxyntic cells are added to compartments and/or by using an external power source to create a voltage across cell layer compartments to induce cell polarization in response to voltage and/or by using an external power source to generate an electrochemical potential across cell layers via the reverse process of electrical energy generation from the neutralization of acid and base across a bipolar membrane as described in U.S. Pat. No. 4,311,771 to induce cell polarization in response to the presence of certain molecular entities. In one application, the cell layers may be formed by the addition of an adhesive containing proteins which induce polarization of oxyntic cells to one side of a separating membrane. This adhesive face of the separating membrane then is placed in contact with a dense mass of unpolarized oxyntic cells, which stick to its surface in a layer that is one cell thick. The proteins contained within the adhesive induce a net direction of polarization of the oxyntic cell layer attached to the adhesive and then the adhesive would dissolve away once the assembled biological battery is implanted into an organism. It should be noted that other cell types besides oxyntic cells may be used to generate an electrochemical gradient capable of powering a biological battery.

As previously noted, biological batteries may be useful in supplying implants with electrical energy, though they may be used in an industrial capacity to generate electrical energy from biomass (such as sewage). However, biological batteries are uniquely suited to the task of powering the circuitry of implanted or implantable devices. Preliminary calculations of theoretical energy output of a biological battery containing 22,000 oxyntic cells show it could produce approximately 3 watts, assuming no ion leakage through the outer membrane, perfect efficiency in the conversion of chemical energy to electrical energy and maximum observed rates of bicarbonate flow observed by oxyntic cells in vitro (11,000 oxyntic cells produce 3 watts of potential chemical energy, but when arranged in 2 layers, only half the potential chemical energy produced by an oxyntic cell layer can be neutralized across the separating membrane, while the rest diffuses out of the outer membrane into the extracellular environment and is wasted). In reality, it is unlikely that all oxyntic cells within a biological battery will receive the amount of cellular nutriment needed to achieve and sustain these maximum observed flow rates, and systems where electricity is generated as outlined in 4,311,771 contain intrinsic inefficiencies, but even assuming experimental efficiency is 25% of the theoretical maximum, roughly 90,000 oxyntic cells are required to produce three watts. Assuming two oxyntic cell layers each one cell thick are separated by a section of bipolar membrane and assuming the diameter of an oxyntic cell is the same as the average epithelial cell at 20 micrometers and assuming the oxyntic cell layers are square in shape, the dimension of one side of this square would measure 4.24 mm. This assumes all cells within the battery have enough glucose available to function at peak capacity. Considering glucose may become scarcer towards the center of the battery as it diffuses into the biological battery from the outside environment and is progressively absorbed by oxyntic cells as it progresses inward, the experimental efficiencies of batteries containing more layers could be less than 25% theoretical maximum. Assuming a conservative estimation of 1% of theoretical efficiency, it would take 2.2 million oxyntic cells to produce a 3-watt biological battery, with 22 million capable of producing 30 watts. Assuming those cells are put into a battery with five cell layers, if the profile of the battery was square, then each side would be 4.195 cm in length. A battery with an output of 100 watts, if 10 cell layers thick and square, would have side lengths of 5.416 cm. Thus, even by conservative estimates, biological batteries look to be powerful sources of energy for implanted circuitry.

This would enable the construction of implants that require much more energy than can be conveniently supplied by an external power source. External power requires a significant amount of space be set aside in the implant solely for storage of electrical power if the implant is last a long time between charges, which means the user benefits from having to recharge less frequently, but comes at the cost of making the implant larger than it would otherwise be and is thus more invasive to implant. Decreasing the amount of space set aside for storage of external energy means the implant can be made smaller and thus less surgically invasive to implant than equivalent devices with greater storage capacity, but comes at the cost of requiring more frequent recharging. The biological battery requires no storage capacity because it can constantly draw energy from its surrounding environment to pump ions which create electrochemical potential when separated by separating membrane capable of converting said electrochemical potential into electrical energy and thus requires no volume for energy storage. The entire volume of the battery can be dedicated to energy production because the supply of chemical energy in the body needed to power the battery is consistent. In addition, because the chemical energy needed to power the biological battery is always present in the tissues of the living organisms it is implanted in, so long as the organism it's implanted in is alive, no charging is ever required. It very well may be the highest-power-density practical means of supplying energy to implanted circuitry. Pacemakers can be made more powerful using biological batteries. In other examples, bone screws and plates can have integrated sensors and circuitry capable of wirelessly transmitting data to an outside receiver if implanted with biological batteries as their power source. Many exciting new biotechnological products become feasible with biological batteries. The instant disclosures may also be useful in powering a brain-computer interface, such as that described in U.S. patent application Ser. No. 17/390,541, all day and night using the energy of the body alone. Electrode arrays or magnetic inductors placed into or onto the muscles of those with paralysis, powered with biological batteries may, for example, receive communications from an implanted brain-computer interface telling them to stimulate muscle activity in certain muscle groups at certain times in a particular way based on brain signals. Implanted sensors powered by biological batteries can provide tactile information to the brain by wirelessly transmitting tactile data to a brain-computer interface for input into somatosensory brain regions. Using biofeedback, a paralyzed person may learn to walk again and spinal injuries could be effectively bypassed & healed. Cochlear implants, bionic eyes, pacemakers, artificial hearts, as well as many other devices, could be implanted with a durable, constant, internal source of power using a biological battery. However, it should be noted that the cells which generate the electrochemical potential for this battery must be immortalized (i.e., made to express all aspects of their phenotype required to generate power in a biological battery while simultaneously made to not express senescence and apoptosis), made to replace nonfunctioning cells, or made to live a very long time in order for biological batteries to function as a durable source of energy for implanted circuitry.

Examples of the biological batteries described herein are shown in several illustrations. Turning to FIG. 1, the outside of a linear biological battery is shown. Specifically, a biological battery 100 may include an enveloping outer membrane 105 extending between a proximal end 102 and a distal end 104. Outer membrane 105 may be permeable to small molecules like carbohydrates and amino acids, but impermeable to proteins (such as immunoglobulins). The arrows on all sides indicate that the battery can be scaled in any dimension (or any combination of dimensions) to accommodate almost any desired geometry for various applications. For example, outer membrane 105 may be shaped as a rectangular prism, a cube, a cylinder, a disk, a sphere or any suitable three-dimensional shape. In addition, the negative and positive leads 110,112 extending out of battery 100 may be connected to a circuit to supply power. Leads 110,112 may be wired in series or parallel circuit configurations with other leads to produce a variety of output configurations.

Figure 2:
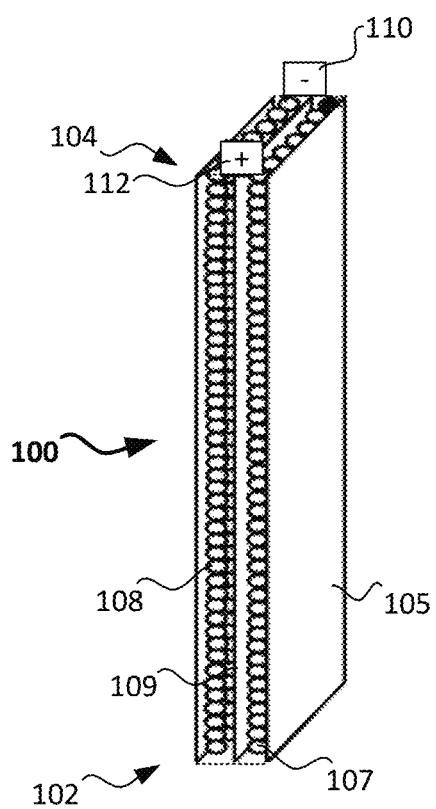
FIG. 2 is a schematic representation of the interior of the biological battery.

Turning now to FIG. 2, the interior of biological battery 100 is shown. Specifically, FIG. 2 shows the outer semipermeable membrane being partially removed to show a simplified, linear biological battery (the equivalent of a single cell in a normal battery). In this example, two parallel oxyntic cell layers 107,108 are divided by separating membrane 109, which has a face permeable to $H^+$, a face permeable to $HCO_3^-$, and is normally bounded on its periphery by sections of outer membrane 105 that have been removed in this figure to reveal the interior. Separating membrane 109 may be distinguished by the positive and negative leads 110,112 attached to it. On the outsides of the cell layers lie sections of outer membrane 105 with portions removed for the sake of showing the interior of the battery 100. In reality, all the illustrated sections of outer membrane would be continuous as in FIG. 1 and form a volume providing a barrier to separate the outside cellular environment from the one contained within the battery, allowing nutrients needed for the biological function of the oxyntic cells contained within to diffuse through, but acting as a barrier to proteins and macromolecules like antibodies. Outer membrane 105 may also form continuous perimeter connections with all sections of separating membrane 109 (e.g., along the top and/or bottom of the cell), thus isolating cell layers into discrete volumes known as cell layer compartments. In one example, the oxyntic cells share a direction of polarization, which ensures that the ions being pumped to each side of a cell layer compartment are of the same kind. In the case of oxyntic cells, this means that $H^+$ ions are pumped to one side of the cell layer compartment and $HCO_3^-$ ions are pumped to the other. Oxyntic cells within the cell layer compartments would be packed in tightly enough that they would be flush with adjacent cells along their periphery, forming highly impermeable cell-to-cell adhesive junctions with adjacent cells along their periphery, effectively dividing the cell layer compartment into two sub-compartments. This reduces the mixing of $H^+$ and $HCO_3^-$ within the cell layer compartment significantly, which serves to maximize efficiency.

Figure 3:
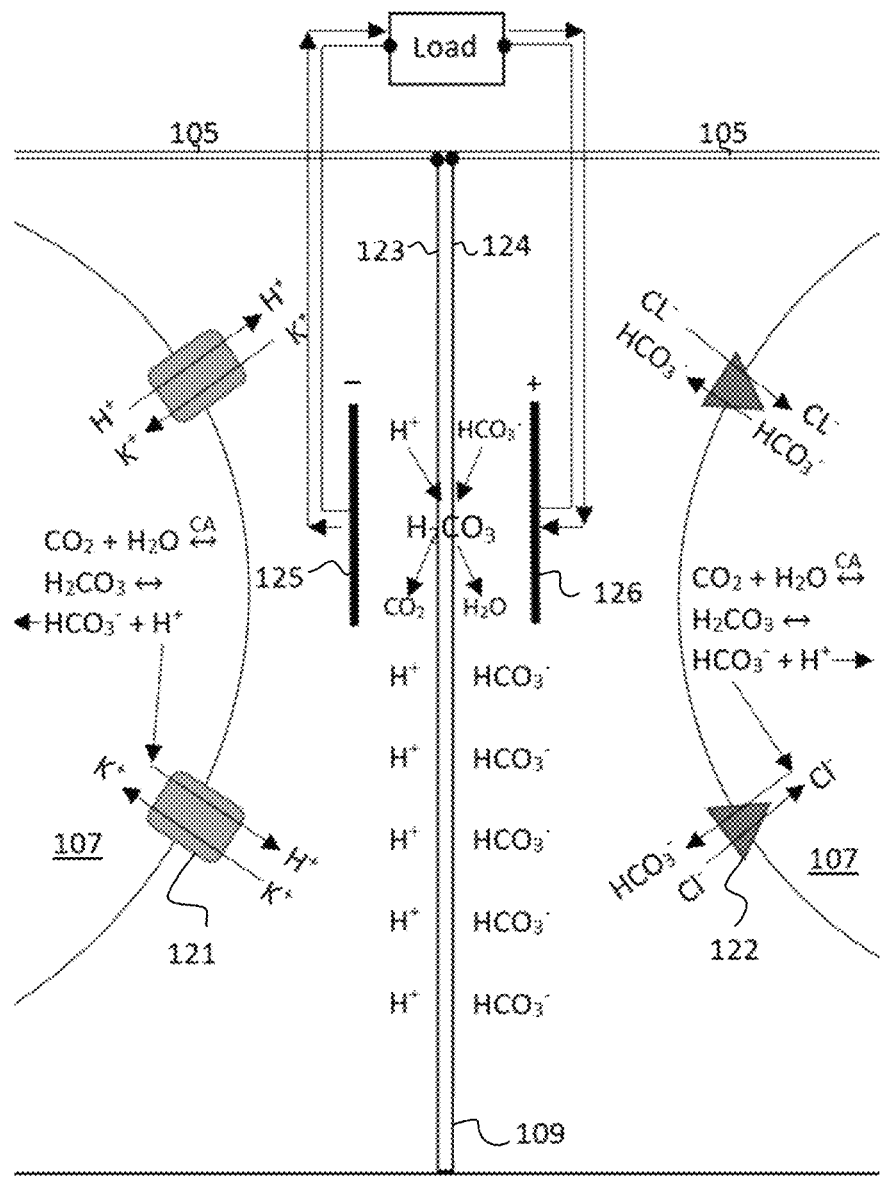
FIG. 3 is a schematic representation of various chemical reactions within a biological battery.

FIG. 3 shows a simplified view of two oxyntic cells sharing a direction of polarization 107 abutting section of separating membrane 109, which is capable of converting the electrochemical potential of an acid and a base separated by a membrane into electrical energy needed to power a circuit. The shared direction of polarization of the cells shown means that the apical sides (which pump $H^+$ out of the cell) of oxyntic cells in one chamber face the basilar sides (which pump $HCO_3^-$ out of the cell) of oxyntic cells in a neighboring compartment. Separating membrane 109 divides these two compartments and can convert the electrochemical potential formed by cells 107 into electrical energy. In nature, oxyntic cells, found in stomach epithelium, are polarized so that their basilar side moves $HCO_3^-$ into the body via $Cl^-/HCO_3^-$ exchange and their apical side pump $H^+$ into the stomach lumen using the protein $H^+/K^+$ ATPase, thus acidifying gastric juices while elevating blood pH. Oxyntic cells in a biological battery would have to be formed into a layer at least one cell thick, polarized in a net direction and encapsulated to form a cell layer compartment. In addition, oxyntic cells would be immortalized, which would provide a long life for the battery once implanted by ensuring the cells which generate the electrochemical potential that powers it do not die in vivo. Unless the population of oxyntic cells in biological batteries can be immortalized or made to replenish, the lifetime of the battery would be 54 days.

In addition, FIG. 3 also illustrates the biochemical pathway by which $HCO_3^-$ and $H^+$ are formed from water ($H_2O$) and carbon dioxide ($CO_2$) within oxyntic cells. These cells are known to produce a large amount of the enzyme carbonic anhydrase (represented by CA in FIG. 3), which functions to catalyze the conversion of carbon dioxide ($CO_2$) and water ($H_2O$) into carbonic acid ($H_2CO_3$) in a reversible reaction. Carbonic acid dissociates into $HCO_3^-$ and $H^+$ in yet another reversible reaction. Although the arrows drawn in this illustration indicate this is a reversible reaction, the reaction within oxyntic cells occurs predominantly one way because the internal concentrations of products ($HCO_3^-$ and $H^+$) are kept low by efflux through $H^+/K^+$ ATPase 121 and $Cl^-/HCO_3^-$ exchangers 122. Thus, the reaction in oxyntic cells is effectively unidirectional as products ($HCO_3^-$ and $H^+$) are removed from the cell & reactants ($CO_2$ and $H_2O$) diffuse into the cell from the surrounding environment to replace reactants consumed.

The mechanism by which electrical current is produced using separating membrane 109 is also illustrated here. $H^+$ cations permeate the cation-selective face 123 of the separating membrane 109 while $HCO_3^-$ anions permeate the anion-selective face 124 of the separating membrane 109. Neutralization occurs within separating membrane 109, producing carbonic acid ($H_2CO_3$), which then dissociates into carbon dioxide ($CO_2$) and water ($H_2O$). Thus, in the region near separating membrane 109, high concentrations of $HCO_3$ and $H^+$ (able to recombine by passing through separating membrane 109) drive the formation of $H_2CO_3$, which then decomposes reversibly into $CO_2$ and $H_2O$. The concentrations of products ($CO_2$ and $H_2O$) in the reverse reaction are kept low by net diffusion away from the site of formation into the surrounding environment. Although this reaction is reversible, the production of reactants by oxyntic cells and the removal of products via diffusion cause the reaction to occur predominantly one way. Thus, the net direction of the reaction outside of the oxyntic cells is towards the formation of $CO_2$ and $H_2O$, exactly opposite of the same reaction occurring inside of the oxyntic cells. Two electrodes, denoted as negative 125 and positive 126 are arranged in the same configuration as in FIG. 1 of 4,311,771. Arrows denote the flow of electrons through the circuit. Oxyntic cells use the chemical energy of biomolecules within the body to power cellular machinery capable of creating electrochemical potential which is converted into electrical energy capable of powering a circuit.

Figure 4:
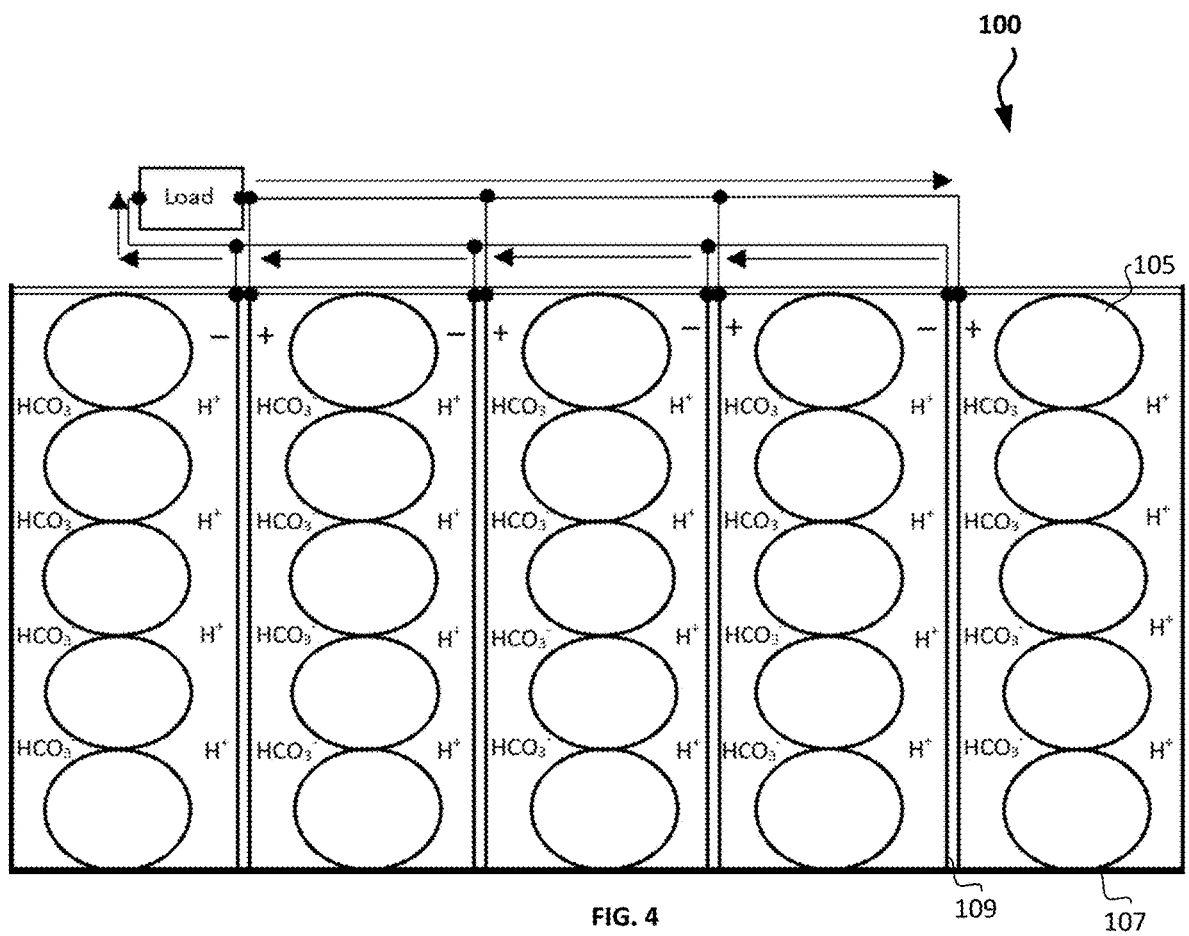
FIG. 4 is a schematic illustration of a biological battery having a plurality of cell layers.

In FIG. 4, a simplified circuit diagram of a biological battery 100 comprising five cell layers (forming four electrochemical cells as each electrochemical cell must include at least two layers) wired in parallel, is powering an attached load using chemical energy from the body. Carbohydrates and fatty acids that diffuse through the encapsulating ultrafiltration outer membrane 105 give the biological cells energy. Amino acids which diffuse through provide the necessary building blocks of cellular machinery. This allows the oxyntic cell (represented by the oval shapes) to perform all of the necessary cellular operations needed to survive as well as pump ions to different sides of their respective cell layer compartments, thus generating an electrochemical potential across a separating membrane 109 capable of generating electrical energy from neutralization of acid and base across it. The electrical energy created from this can be put to work powering a circuit which no longer needs an external power source to function within the body of an organism. All the energy may be derived internally from the body's chemical energy. Oxyntic cells, being a type of epithelial cell, form an effectively continuous impenetrable barrier across the middle of a cell layer compartment, which effectively divides each cell layer compartment into two sub-compartments. This reduces the amount of neutralization between $HCO_3^-$ and $H^+$ that occurs within compartments. It is desirable for efficiency's sake that as much neutralization between conjugate acid-base pairs occur across separating membrane 109 as possible, because only in this way can energy can be harvested to power a circuit. Note, the arrows in this diagram are used to denote the direction of flow of electrons through the circuit and the electrodes are shown as being printed onto the surface of the separating membrane, with the negative electrode printed onto the side of separating membrane labelled—and the positive electrode printed onto the side of the separating membrane labelled +. In this example electrons travel from the negative electrodes, into the wire connecting the negative electrodes to the load, through the load, then into the wire connecting the positive electrodes to the load, then into the positive electrodes. Though the wiring here is in parallel, simple, linear biological batteries can also be made by wiring cells in series as well. In fact, biological batteries can be wired in a combination of parallel and series to modify output voltage and current to accommodate specific applications.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with others of the described embodiments.

I claim:

1. A biological electrochemical cell comprising:
   at least two cell layers, each cell layer being formed of a sheet of biological cells, the biological cells being polarized in a same direction; and
   a separating membrane disposed between each of the at least two cell layers.

2. A biological battery comprising:
   at least one biological electrochemical cell of claim 1; and
   an encapsulating outer membrane encasing the at least one biological electrochemical cell.

3. The biological battery of claim 2, wherein the at least one biological electrochemical cell comprises multiple electrochemical cells.

4. The biological battery of claim 3, wherein the encapsulating outer membrane is permeable to glucose and amino acids, but substantially impermeable to antibodies.

5. The biological battery of claim 4, wherein the biological cells comprise acid-producing cells.

6. The biological battery of claim 4, wherein the biological cells comprise oxyntic cells.

7. The biological battery of claim 3, wherein a total count of the multiple electrochemical cells is equal to a total count of separating membranes.

8. The biological battery of claim 3, wherein a total count of the at least two cell layers is equal to a total count of separating membranes.

9. The biological battery of claim 3, wherein a total count of the at least two cell layers is one greater than a total count of separating membranes.

10. The biological battery of claim 3, wherein, within each of the multiple electrochemical cells, conjugate-acid cations from a first cell layer abut conjugate-base anions of a neighboring second cell layer, separated by a portion of the separating membrane.

11. The biological battery of claim 3, wherein the multiple electrochemical cells comprise multiple separating membranes, each of the separating membranes being fused along a periphery to the encapsulating outer membrane.

12. The biological battery of claim 11, further comprising at least two leads coupled to the separating membranes and passing through the encapsulating outer membrane.

13. The biological electrochemical cell of claim 1, wherein the biological cells are unidirectionally polarized by blotting proteins that induce oxyntic cell polarization onto specific sides of the separating membrane before oxyntic cells are added to compartments.

14. The biological electrochemical cell of claim 1, wherein the biological cells are unidirectionally polarized by using an outside power source to create a voltage across the at least two cell layers to induce cell polarization in response to an electric potential.

15. A biological battery comprising:
   a first cell layer formed of a sheet of biological cells polarized in a same direction;
   a second cell layer formed of a sheet of biological cells polarized in the same direction;
   a separating membrane disposed between the first cell layer and the second cell layer; and
   an encapsulating outer membrane encasing each of the first cell layer, the second layer and the separating membrane, wherein the encapsulating outer membrane is permeable to glucose and amino acids, but substantially impermeable to antibodies.

16. The biological battery of claim 15, wherein the biological cells comprise acid-producing cells.

17. The biological battery of claim 15, wherein the biological cells comprise oxyntic cells.

18. The biological battery of claim 15, further comprising additional cell layers and additional separating membranes.

19. The biological battery of claim 15, wherein conjugate-acid cations from the first cell layer abut conjugate-base anions of the second cell layer, separated by a portion of the separating membrane.

20. The biological battery of claim 15, further comprising at least two leads coupled to the separating membrane and passing through the encapsulating outer membrane.

* * * * *